(12) United States Patent
Fullenkamp et al.

(10) Patent No.: US 12,252,194 B2
(45) Date of Patent: Mar. 18, 2025

(54) TETHERED TEMPERATURE SENSOR FOR USE IN RUBBER EMBEDDED APPLICATIONS

(71) Applicant: ContiTech Transportbandsysteme GmbH, Hannover (DE)

(72) Inventors: Daniel Fullenkamp, Coldwater, OH (US); Paul John Peterson, Cuyahoga Falls, OH (US); Jack Bruce Wallace, Powell, OH (US)

(73) Assignee: ContiTech Deutschland GmbH, Hannover (DE)

( * ) Notice: Subject to any disclaimer, the term of this patent is extended or adjusted under 35 U.S.C. 154(b) by 0 days.

(21) Appl. No.: 17/662,440

(22) Filed: May 9, 2022

(65) Prior Publication Data

US 2022/0258814 A1    Aug. 18, 2022

Related U.S. Application Data

(63) Continuation of application No. 17/250,924, filed as application No. PCT/EP2019/086218 on Dec. 19, 2019, now Pat. No. 11,352,077.

(Continued)

(51) Int. Cl.
*G01K 7/22* (2006.01)
*B60Q 9/00* (2006.01)
(Continued)

(52) U.S. Cl.
CPC .............. *B62D 55/08* (2013.01); *B60Q 9/00* (2013.01); *B60R 16/033* (2013.01); *B62D 55/24* (2013.01);
(Continued)

(58) Field of Classification Search
CPC .. H01Q 1/2241; B60C 23/0493; B62D 55/08; B62D 55/24; B62D 55/32; B60Q 9/00;
(Continued)

(56) References Cited

U.S. PATENT DOCUMENTS

| | | | | |
|---|---|---|---|---|
| 4,435,713 A | * | 3/1984 | Gasparaitis | H01Q 1/36 343/702 |
| 4,787,575 A | * | 11/1988 | Stewart | B64B 1/50 244/33 |

(Continued)

FOREIGN PATENT DOCUMENTS

| | | | | |
|---|---|---|---|---|
| CN | 100404287 C | * | 7/2008 | ........... B60C 19/003 |
| CN | 101337491 A | * | 1/2009 | ............ B60T 8/1725 |

(Continued)

OTHER PUBLICATIONS

17662440_2023-05-22_CN_100404287_C_H.pdf,Jul. 2008.*

(Continued)

*Primary Examiner* — Gail Kaplan Verbitsky
(74) *Attorney, Agent, or Firm* — Gregory Adams; Richard Wolf

(57) ABSTRACT

One general aspect includes a tethered temperature sensor for use within a vehicle track. The tethered temperature sensor includes one or more sensors for measuring temperature located in a high strain and high temperature region of the vehicle track. The sensor also includes circuitry configured to control and/or monitor the one or more sensors and located in a low strain and low temperature region of the vehicle track. The sensor also includes a housing to contain the circuitry. The sensor also includes an encapsulating material that fills an interior of the housing.

15 Claims, 3 Drawing Sheets

Related U.S. Application Data

(60) Provisional application No. 62/786,627, filed on Dec. 31, 2018.

(51) Int. Cl.

| | | |
|---|---|---|
| *B60R 16/033* | (2006.01) | |
| *B62D 55/08* | (2006.01) | |
| *B62D 55/24* | (2006.01) | |
| *B62D 55/32* | (2006.01) | |
| *G01K 1/024* | (2021.01) | |
| *G01K 1/14* | (2021.01) | |
| *G01K 3/00* | (2006.01) | |
| *G01K 3/04* | (2006.01) | |
| *G07C 5/08* | (2006.01) | |

(52) U.S. Cl.
CPC ............ *B62D 55/32* (2013.01); *G01K 1/024* (2013.01); *G01K 1/14* (2013.01); *G01K 3/005* (2013.01); *G01K 3/04* (2013.01); *G01K 7/22* (2013.01); *G07C 5/0816* (2013.01)

(58) Field of Classification Search
CPC ........ B60R 16/033; G01K 1/024; G01K 1/14; G01K 3/005; G01K 3/04; G01K 7/22
See application file for complete search history.

(56) References Cited

U.S. PATENT DOCUMENTS

| | | | | |
|---|---|---|---|---|
| 5,218,861 | A  * | 6/1993 | Brown | G06K 19/07779 340/448 |
| 5,483,827 | A | 1/1996 | Kulka et al. | |
| 6,147,659 | A  * | 11/2000 | Takahashi | B60C 19/00 343/866 |
| 6,238,929 | B1 * | 5/2001 | Antonenko | B01J 19/0046 436/174 |
| 6,352,149 | B1 | 3/2002 | Gartland | |
| 6,715,602 | B1 | 4/2004 | Gartland | |
| 6,729,180 | B2 * | 5/2004 | Sanchez | B60C 23/0408 340/447 |
| 6,853,347 | B2 * | 2/2005 | Forster | B60C 23/0408 343/793 |
| 7,019,711 | B2 * | 3/2006 | Johnson | B60C 23/0493 340/447 |
| 7,563,021 | B2 * | 7/2009 | Ichihara | G01K 13/08 374/102 |
| 8,355,843 | B2 * | 1/2013 | Visconti | B60C 23/20 701/36 |
| 8,715,204 | B2 * | 5/2014 | Webster | G01K 1/024 600/549 |
| 8,742,915 | B2 | 6/2014 | Vassilieff | |
| 8,746,739 | B2 | 6/2014 | Meggs et al. | |
| 9,590,662 | B2 * | 3/2017 | Park | H04B 15/00 |
| 9,643,460 | B2 * | 5/2017 | Peine | B60C 23/0454 |
| 9,989,976 | B2 | 6/2018 | Garvin et al. | |
| 10,272,959 | B2 | 4/2019 | Zuchoski et al. | |
| 10,933,877 | B2 | 3/2021 | Lussier et al. | |
| 11,046,377 | B2 | 6/2021 | Boily | |
| 11,068,002 | B2 * | 7/2021 | Garvin | E02F 9/268 |
| 2002/0116274 | A1 * | 8/2002 | Hind | G06K 19/07779 705/23 |
| 2002/0121132 | A1 | 9/2002 | Breed et al. | |
| 2002/0148690 | A1 | 10/2002 | Wirth et al. | |
| 2003/0021330 | A1 * | 1/2003 | Aubel | B60C 23/0493 374/142 |
| 2004/0140030 | A1 * | 7/2004 | Hahn | B60C 19/00 152/565 |
| 2005/0132788 | A1 * | 6/2005 | Lionetti | B60C 23/0493 73/146 |
| 2005/0150283 | A1 | 7/2005 | Shick et al. | |
| 2006/0093015 | A1 | 5/2006 | Ichihara et al. | |
| 2006/0245914 | A1 | 11/2006 | Adam | |
| 2006/0260389 | A1 | 11/2006 | Rimkus et al. | |
| 2009/0149918 | A1 * | 6/2009 | Krulevitch | A61N 1/3787 607/60 |
| 2011/0308873 | A1 * | 12/2011 | Kim | B62D 61/00 180/218 |
| 2015/0007918 | A1 | 1/2015 | Hironaka et al. | |
| 2015/0151922 | A1 | 6/2015 | Wallace et al. | |
| 2016/0332493 | A1 * | 11/2016 | Atsumi | B60C 23/0428 |
| 2017/0250633 | A1 | 8/2017 | Moiraghi et al. | |
| 2018/0190045 | A1 | 7/2018 | Richard et al. | |
| 2018/0265145 | A1 | 9/2018 | Todd et al. | |
| 2020/0042023 | A1 * | 2/2020 | Garvin | B62D 55/08 |
| 2021/0024150 | A1 | 1/2021 | Boily et al. | |
| 2021/0074089 | A1 * | 3/2021 | Richard | B62D 55/26 |
| 2021/0173399 | A1 | 6/2021 | Richard et al. | |

FOREIGN PATENT DOCUMENTS

| | | | | |
|---|---|---|---|---|
| JP | H10119845 | A | 5/1998 | |
| JP | 4100868 | B2 * | 6/2008 | ........ B60C 23/0493 |
| JP | 2009260684 | A  * | 11/2009 | |
| WO | WO-2004068769 | A2 * | 8/2004 | ........ B60C 23/0433 |
| WO | WO2010048334 | A  * | 4/2010 | |
| WO | 2016042580 | A1 | 3/2016 | |
| WO | WO-2017049393 | A1 * | 3/2017 | ............ B60K 31/00 |
| WO | WO-2017156545 | A1 * | 9/2017 | .......... A61B 5/0015 |
| WO | 2019109191 | A1 | 6/2019 | |
| WO | 2020044986 | A1 | 3/2020 | |

OTHER PUBLICATIONS

17662440_2024-02-13_WO_2017049393_A1_H.pdf,Mar. 30, 2017.*
17662440_2024-06-05_WO_2017156545_A1_H.pdf, Sep. 14, 2017.*
17662440_2024-10-31_JP_4100868_B2_H.pdf, Jun. 11, 2008.*
International Search Report dated Apr. 17, 2020 of International Application PCT/EP2019/086218 on which this application is based.
Third-party submission has been filed on Feb. 10, 2022 in the U.S. Appl. No. 17/250,924 on which this application is based.
Search Report dated Sep. 1, 2023 of counterpart EP application 19 835 642.0.
"WTTM" Wireless Track Temperature Measuring System, Army TARDEC, extracted on May 22, 2024 (https://heres-to-us.com/index.php/case-studies/wttm).

* cited by examiner

TETHERED TEMPERATURE SENSOR FOR USE IN RUBBER EMBEDDED APPLICATIONS

This Patent Application is a Continuation Application of, and claims priority to, U.S. Nonprovisional patent application Ser. No. 17/250,924 filed Mar. 27, 2021, which is incorporated herein in its entirety, by reference, and which was a 371 application of PCT/EP2019/086218, and claimed priority to, U.S. provisional Patent Application No. 62/786,627 filed Dec. 31, 2018, which is also incorporated herein in its entirety, by reference.

FIELD OF THE INVENTION

The field to which the disclosure generally relates is rubber products exposed to high temperature conditions, and in particular using tethered temperature sensors embedded in rubber products for temperature measurement and monitoring of the rubber product.

BACKGROUND

Rubber products provide many benefits including traction, durability, repairability and the like when compared with other technologies.

However, rubber products can be susceptible to degradation due to high temperatures and the like. Such temperatures can be based on environmental conditions or use. As a result, this degradation can result to shortened product lifetime, failures and the like.

What is needed are techniques to monitor operating conditions of rubber products.

LIST OF FIGURES

DETAILED DESCRIPTION

Figure 1:
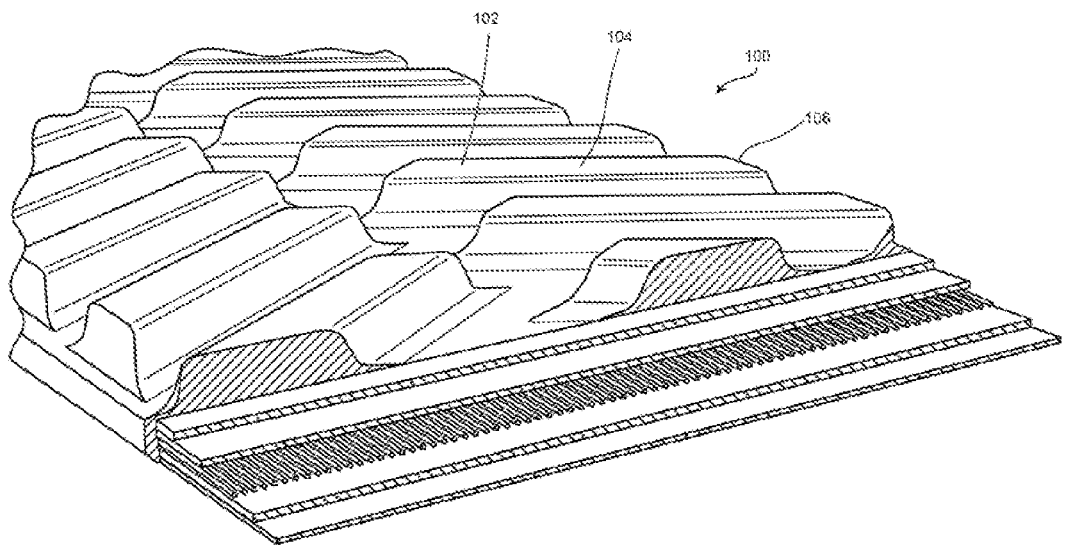
FIG. 1 is a cut away view of a track 100 in accordance with one or more embodiments.

The field to which the disclosure generally relates is rubber products exposed to high temperature conditions, and in particular using tethered temperature sensors embedded in rubber products for temperature measurement and monitoring of the rubber product.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

For some rubber products, such as rubber tracks, operating loaded equipment having rubber tracks driven or otherwise conveyed higher speeds and on hard surfaces may result in significant heat build-up within the track, which may lead to track degradation, or even ultimately, track failure. In accordance with the disclosure, utilizing a temperature sensor to monitor the internal temperature of the track and monitoring that temperature in the cab of the vehicle utilizing this sensor, proactive steps can be taken to avoid track degradation prior to the temperature reaching a critical level for track degradation to occur.

Some embodiments according to the disclosure include one or more tethered temperature sensors embedded into a rubber product, where the tethered temperature sensor includes a sensor component connected to an electronic component. Generally, the electronic component and sensor component are separated due to the temperature ranges the sensor component would be exposed to, which may be temperatures values higher than the survivability of the electronic circuit board and battery included in the electronic component. Accordingly, the sensor component is disposed in a high temperature region of the rubber product, while the electronic component disposed in a comparatively low temperature region of the same product. In some aspects, leads running between, and connecting the sensor component to the electronic component may also perform as an antenna structure. In some aspects, the tethered temperature sensors include the electronic component secured and protected in a suitable potting material, prior to being integrated into the rubber product.

The tethered temperature sensors according to the disclosure may be incorporated into the rubber product by any suitable technique such as building the rubber product with the tethered temperature sensor(s) provided in the rubber product prior to curing, or, in some other aspects, integrating the tethered temperature sensor(s) into the rubber product after curing.

FIG. 1 is a cut away view of a track 100 in accordance with one or more embodiments. FIG. 1 shows a sectional perspective and cut away view of a track 100, which is one example of a rubber product in which some embodiments of the disclosure may be integrated. It is appreciated that the track 100 is provided for illustrative purposes and that suitable variations are contemplated.

Track 100 includes a plurality of ground engaging lugs 106, located on both sides of the track, as shown. The ground engaging lugs 106 generally have a hot region 104 and cold region 102. Hot regions 104 are generally those portions of the track which encounter significantly high temperature during operation of the vehicle propelling the track, for example, temperatures of 150 degrees Celsius (C.) and above, 170 deg C. and above, or even 190 deg C. and above.

Figure 2:
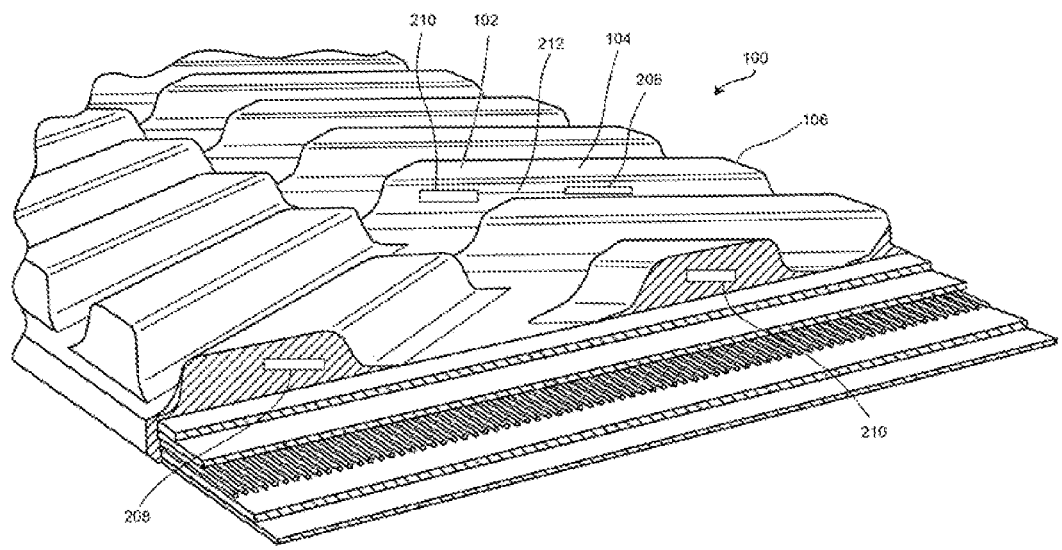
FIG. 2 is a diagram illustrating a sectional perspective and cut away view of the track 100 in accordance with one or more embodiments.

FIG. 2 is a diagram illustrating a sectional perspective and cut away view of the track 100 in accordance with one or more embodiments. FIG. 2 shows the sectional perspective and cut away view of track 100 including tethered temperature sensors embedded in track 100. FIG. 2 is provided for illustrative purposes as an example and it is appreciated that suitable variations are contemplated.

The tethered temperature sensors include electronic component 210, sensor component 208, within a single ground engaging lug 106, and which are connected by lead(s) 212. It is noted that electronic component 210, sensor component 208, and lead(s) 212 are contained within the individual ground engaging lug 106, in the embodiment shown. In some aspects, the electronic component 210 is located where there is not direct contact with wheels.

The temperature sensors that could be used in the tethered temperature sensors, include thermocouples, thermistors, infrared sensors, resistance temperature detectors, s/c devices, and the like.

The tethered temperature sensors have capability of transmitting temperature data to any suitable receiving apparatus, such as, but not limited to, those disclosure in U.S. Pat. No. 8,742,915B2, the disclosure of which is incorporated herein in it's entirety, by reference thereto. On example of a suitable temperature receiving apparatus is a Continental Tire Pressure Monitoring System having temperature monitoring capability. Some non-limiting examples of transmitting modulations including AM, FM, FSM to optimize signal transmission.

Figure 3:
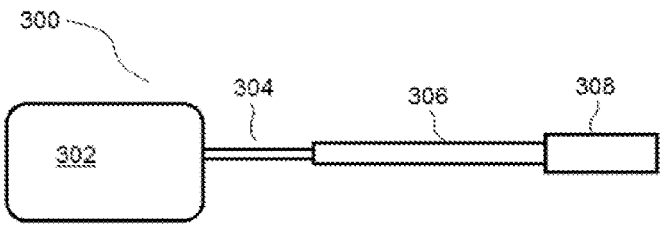
FIG. 3 is a diagram illustrating a tethered temperature sensor 300 in accordance with one or more embodiments.

FIG. 3 is a diagram illustrating a tethered temperature sensor 300 in accordance with one or more embodiments. In this example, the tethered temperature sensor 300 includes a potted electronic component 302 having an electronic circuit board and battery therein. A plurality of leads 304 (or otherwise electrical conductors) are connected to temperature sensor component 308, and may also perform as an antenna structure. In some aspects, the leads 304 are partially disposed in a temperature protecting sheath 306, where located in a hot region of a rubber product.

The temperature protecting sheath 306 can extend from the component 302 to the sensor component 308. In another example, the sheath 306 extends from the sensor component 308 until a distance from the electronic component 302. In yet another example, the sheath 306 extends from the electronic component until a second distance from the sensor component 308.

The sensor component 308 is a temperature sensor. The sensor component 308 can include one or a plurality of temperature sensors. Furthermore, the sensor component 308 can include other types of sensors in addition to and/or instead of temperature sensors such as, but not limited to, pressure sensor, humidity sensor, and the like.

The electronic component 302 can include a housing that at least partially encases and/or protects the electronic component 302. The housing has a material selected to mitigate temperature and/or strain from impacting the electronic component 302.

The electronic component 302 includes circuitry configured to obtain measurement information and the like from the sensor 308. The electronic component 302 can also include other elements such as transceivers, antennas, signal processing circuitry, modulation circuitry, and the like.

The electronic component 302 is typically positioned to be in a lower strain and/or lower temperature regions of the rubber product whereas the sensor component 308 is located in a higher strain and/or higher temperature region of the rubber product. In one example, a lower temperature region is a region that is less than about 150 degrees Fahrenheit (F.) during operational use of the rubber product. In another example, a lower temperature region is a region that is less than about 140 degrees F. during operation use of the rubber product. An example of a lower strain region is a region having a strain less than about 100 percent, 200 percent and the like. An example of a higher temperature region is a region that has a temperature exceeding 150 degrees F. An example of a higher strain region is a region having a strain level greater than about 200 percent or 300 percent. The higher strain region can also be a load bearing region, such as a load bearing tread of a vehicle track.

In yet another example, the electronic component 302 is the component 210 described above and can be positioned in the cold region 102. The lead 304 is the leads 212 and the sensor component 308 is the sensor component 208, which is positioned in the hot region 104.

Figure 4:
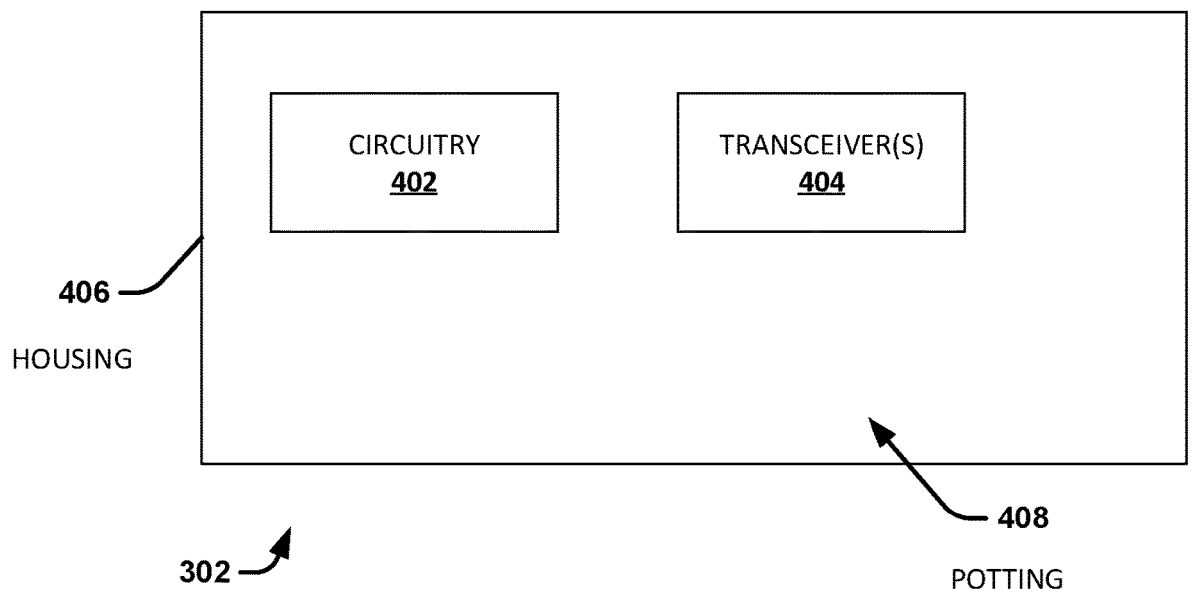
FIG. 4 is a diagram illustrating the electronic component 302 in additional detail in accordance with one or more embodiments.

FIG. 4 is a diagram illustrating the electronic component 302 in additional detail in accordance with one or more embodiments. The component 302 can be used with the embodiments/examples shown in the above figures. It is appreciated that suitable variations are contemplated.

The component 302 includes a housing 406, circuitry 402, one or more transceivers 404 and an encapsulating or potting material 408. The housing 406 is configured to protect the circuitry 402 and/or the transceivers 404.

The electronic component 302 can also include other elements such as, antennas, signal processing circuitry, modulation circuitry, power storage, battery and the like.

The potting material 408 can be made of a ceramic type material or equivalent (to extend the life of a battery) where the potting material has been selected where the thermal conductivity is significantly lower then that of rubber and where a significantly lower thermal conductive material is used as a potting compound the internal sensor is mounted close to the external surface of the potting material or the sensor is exposed to the outer shell via a thermally conductive metal strip.

It is appreciated that In some embodiments, methods or mechanisms for saving battery life are used. For example, sensor activation may be based on motion. Additionally, a supervisor beacon may be enabled allowing for security monitoring of the asset.

As described above, in some aspects, the electronic component and sensor component are separated due to environmental conditional requirement for temperature range, where the temperature sensor will be measuring temperatures above the survivability of the electronic circuit board and battery. Rigid durable packaging for the electronic may be used to provide isolation from rubber strains, or even potted electronic packages may also offer strain isolation while being able to handle the high stresses associated with application.

The leads, or otherwise conductive elements, are used to link the electronic component to the temperature sensor component. In some aspects, linking the electronic component to the temperature sensor component may be made by a connection such as a sine wave pattern of wire, flexible conductive element(s), braided conductive element(s), rigid protected conductive element, and the like. Some examples of flexible conductive elements include those disclosed in U.S. Pat. Nos. 9,452,892 and 6,352,149, the disclosures of which is incorporated herein in their entirety, by reference thereto.

In some aspects of the disclosure, embodiments also provide survivability of the high applied stresses during operation, survivability of sensors in the high strain areas during operation, or even electronic component survivability at temperatures required to be monitored. Additionally, reliable transmission of sensor data is possible from electronics embedded in rubber, as well as proximity to metallic components of the rubber product and surrounding structure of the equipment. Additionally, some embodiments according to the disclosure have the ability to provide temperature sensor and electronics which survive molded and cured rubber product manufacturing processes. In some other aspects, reduction of battery requirements by using regenerative technologies such as piezoelectric transducer, or even use of pyroelectric devices to energize electronic circuits when track is in use, are possible advantages.

In addition to the track applications described above, embodiments of the disclosure may be integrated and used with other suitable rubber products, such as but not limited to, tires, conveyor belts, air springs, molded products, high temperature hoses, and the like. Additionally, in some aspects, temperature measurements made in accordance with the disclosure could be used to control a vehicle through a vehicle control module to slow the speed of, or even stop the vehicle, as a proactive measure. In some further aspects, systems may capture an absolute threshold, or rate of rise in temperature, or both to provide direct feedback to slow or stop the vehicle.

In one example, the remote sensor 308 is located directly under a wheel and or where the exposed pressure is enough to crush remote sensor circuitry. The remote sensor is protect with a metal structure or equivalent as a sensor housing to mitigate or prevent damage to the remote sensor. An example of a suitable metal structure is a metal cylinder. It is appreciated that other structurers and the like that protect and/or mitigate crushing of the sensor 308 are contemplated.

In another example, a battery is used as a power source for the electronics component 302. A potting material can be used to encase the battery and/or circuitry. The potting material can be made of a ceramic type material or equivalent (to extend the life of the battery) where the potting material has been selected where the thermal conductivity is significantly lower then that of rubber and where a significantly lower thermal conductive material is used as a potting compound the internal sensor is mounted close to the external surface of the potting material or the sensor is exposed to the outer shell via a thermally conductive metal strip.

In another example, a hard epoxy, ceramic material and the like can be used to mitigate sheer as the tether/lead transitions from the hard epoxy or ceramic like material into the rubber a silicon or like material, which is introduced in the molding process at the boundary of the as the tether exits the mold.

In yet another example, to support the manufacture of the electronics/circuitry of the electronics component 302, a pre-molded thin walled cup is used to position and support the electronics and hold a silicon like transition material. The epoxy or like material is poured into the cup with the electronics. The cup becomes part of the enclosure/housing.

In another example, a rubber material or the like is located around or surrounds the temperature sensor 308 to facilitate conduction of heat (thermal energy) to the sensor 308 to assist accuracy and real time temperature reading. In another example, a material is selected to surround the sensor 308 based on a selected or desired time delay in the detection of the temperature.

One general aspect includes a tethered temperature sensor for use within a vehicle track. The tethered temperature sensor also includes one or more sensors for measuring temperature located in a high strain and high temperature region of the vehicle track. The sensor also includes circuitry configured to control and/or monitor the one or more sensors and located in a low strain and low temperature region of the vehicle track. The sensor also includes a housing to contain the circuitry. The sensor also includes an encapsulating material that fills an interior of the housing.

Implementations may include one or more of the following features. The sensor may include a conductive tether configured to electrically connect the one or more sensors to the circuitry. The sensor, may include a transceiver configured to transmit measured temperatures from the one or more sensors. The sensor may include one or more antenna connected to the transceiver. The transceiver is configured to utilize one or more communication protocols or standards selected from a group may include, radio frequency (RF), RFID, Bluetooth, Wifi, 4G and 5G. The transceiver is external to the housing. The transceiver is positioned within the housing. The transceiver is configured to transmit measured temperatures from the one or more sensors and the circuitry to a remote tracking system. The remote tracking system is configured to generate an alert based on a selected alarm range of temperatures. The circuitry is configured to determine a track temperature of a tread portion of the track based on measurements of the one or more temperature sensors. The circuitry determines a track temperature based on an average of measured temperatures from the one or more temperature sensors over a time period. The time period is selected from a range of 10 milliseconds (ms) to 60 seconds. The one or more sensors may include an integrated circuit (IC). The sensor may include a conductive tether embedded within the rubber track and configured to connect to the one or more sensors. The conductive tether is/can be configured to operate as an antenna. The conductive tether is may include of a flexible conductive material and provides at least 300 percent elongation. The one or more sensors may include one or more thermistors. The sensor may include a power source configured to supply power for operation of the one or more sensors and the circuitry. The power source is a battery. The power source is configured to passively provide power to the one or more sensors. The circuitry is configured to generate temperature over time and/or over distance traveled.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A tethered temperature system comprising:
   a sensor for measuring temperature of a rubber product, the sensor of one or more sensors;
   circuitry configured to control and/or monitor the one or more sensors;
   a conductive tether embedded within the rubber product and configured to connect to the sensor, the conductive tether is configured to operate as an antenna; and
   the conductive tether is comprised of a flexible conductive material and provides at least 300 percent elongation; and
   the circuitry within a housing and encased in a ceramic potting material having a thermal conductivity lower than that of rubber;
   the sensor exposed to an outer shell;
   the sensor positioned toward an edge portion of the rubber product and the circuitry positioned toward a middle portion of the rubber product.

2. The system of claim 1, the conductive tether configured to electrically connect the sensor to the circuitry.

3. The system of claim 1, further comprising a transceiver configured to transmit measured temperatures from the one or more sensors.

4. The system of claim 3, the transceiver configured to transmit using frequency shift modulation (FSM).

5. The system of claim 3, the transceiver configured to transmit using frequency modulation (FM).

6. The system of claim 3, the transceiver configured to transmit the measured temperatures to a tire pressure monitoring system.

7. The system of claim 1, the sensor and the circuitry positioned within a single drive lug of the rubber product.

8. The system of claim 1, the sensor positioned within a first drive lug of the rubber product and the circuitry positioned within a second drive lug of the rubber product.

9. The system of claim 1, the circuitry positioned within a region of the rubber product having temperatures less than about 150 degrees Fahrenheit.

10. The system of claim 1, the circuitry positioned within a strain region having a strain less than about 100 percent.

11. The system of claim 1, further comprising a transceiver utilize one or more communication protocols selected from a group comprising, radio frequency (RF), RFID, Bluetooth, WiFi, 4G and 5G for communicating measured temperature.

12. The system of claim 1, the sensor having activation based on motion.

13. The system of claim 1, the rubber product comprising a tire.

14. The system of claim 1, the rubber product comprising a hose.

15. The system of claim 1, the rubber product comprising a conveyor belt.

* * * * *